United States Patent [19]

Urbani

[11] Patent Number: 5,041,165
[45] Date of Patent: Aug. 20, 1991

[54] DIRTY SURFACE CLEANING METHOD

[76] Inventor: William G. Urbani, 22520 Benjamin Holt Rd., Stockton, Calif. 95207

[21] Appl. No.: 767,005

[22] Filed: Aug. 19, 1985

Related U.S. Application Data

[63] Continuation-in-part of Ser. No. 662,880, Oct. 19, 1984, Pat. No. 4,527,709, and a continuation-in-part of Ser. No. 657,284, Oct. 2, 1984, Pat. No. 4,619,815.

[51] Int. Cl.⁵ .................................. B08B 9/08
[52] U.S. Cl. .................................. 134/22.18; 15/302; 134/19; 134/104.4; 210/257.1; 210/332
[58] Field of Search .................. 134/22.18, 19, 104, 134/109, 110, 111, 166 R, 167 R, 168 R, 186, 10; 210/257.1, 332, 195.1, 195.3; 15/302

[56] References Cited

U.S. PATENT DOCUMENTS

| | | | |
|---|---|---|---|
| 584,406 | 6/1897 | Rowan. | |
| 1,176,774 | 1/1900 | Morris | 210/522 |
| 2,139,096 | 12/1938 | Piquerez | 210/522 |
| 2,834,359 | 5/1958 | Kearney | 210/500 |
| 3,447,545 | 6/1969 | Lawter | 15/109 |
| 3,502,215 | 3/1910 | Cahan | 210/167 |
| 3,719,191 | 3/1973 | Zimmerly | 134/102 |
| 4,018,622 | 4/1977 | Wright et al. | 252/87 |
| 4,134,174 | 1/1979 | Flynn et al. | 134/8 |
| 4,398,551 | 8/1983 | Moorehead | 134/104 |
| 4,466,154 | 8/1984 | Urbani | 15/302 |
| 4,530,131 | 7/1985 | Zell et al. | 134/302 |

OTHER PUBLICATIONS

Oliver, J. T., Western Electric Technical Digest No. 37, pp. 19-20, Jan. 1975.

Primary Examiner—Asok Pal
Attorney, Agent, or Firm—Townsend and Townsend

[57] ABSTRACT

The disclosed cleaning method is carried out using a pressure vessel containing a cleaning liquid pumped out of the pressure vessel and into a dirty tank. Cleaning liquid and dislodged contaminants are sucked up from the dirty tank by a partial vacuum created above the cleaning liquid within the pressure vessel. Solids and cleaning liquid are pumped from the pressure vessel at a first rate and are separated by a solids separator with the cleaning liquid being centrifuged to remove fine solids and then collected in a makeup tank. Cleaning liquid from the makeup tank is pump into the dirty tank at a second rate, less than the first rate. Excess liquid in the makeup tank is sucked back into the pressure vessel. A phase separator, mounted beneath the suction inlet, speeds the separation and concentration of solids, liquids and gases/vapors. The phase separator includes a number of vertically aligned, downwardly and inwardly tapered truncated conical concentrators with open tops and open bottoms above and below the free surface.

15 Claims, 2 Drawing Sheets

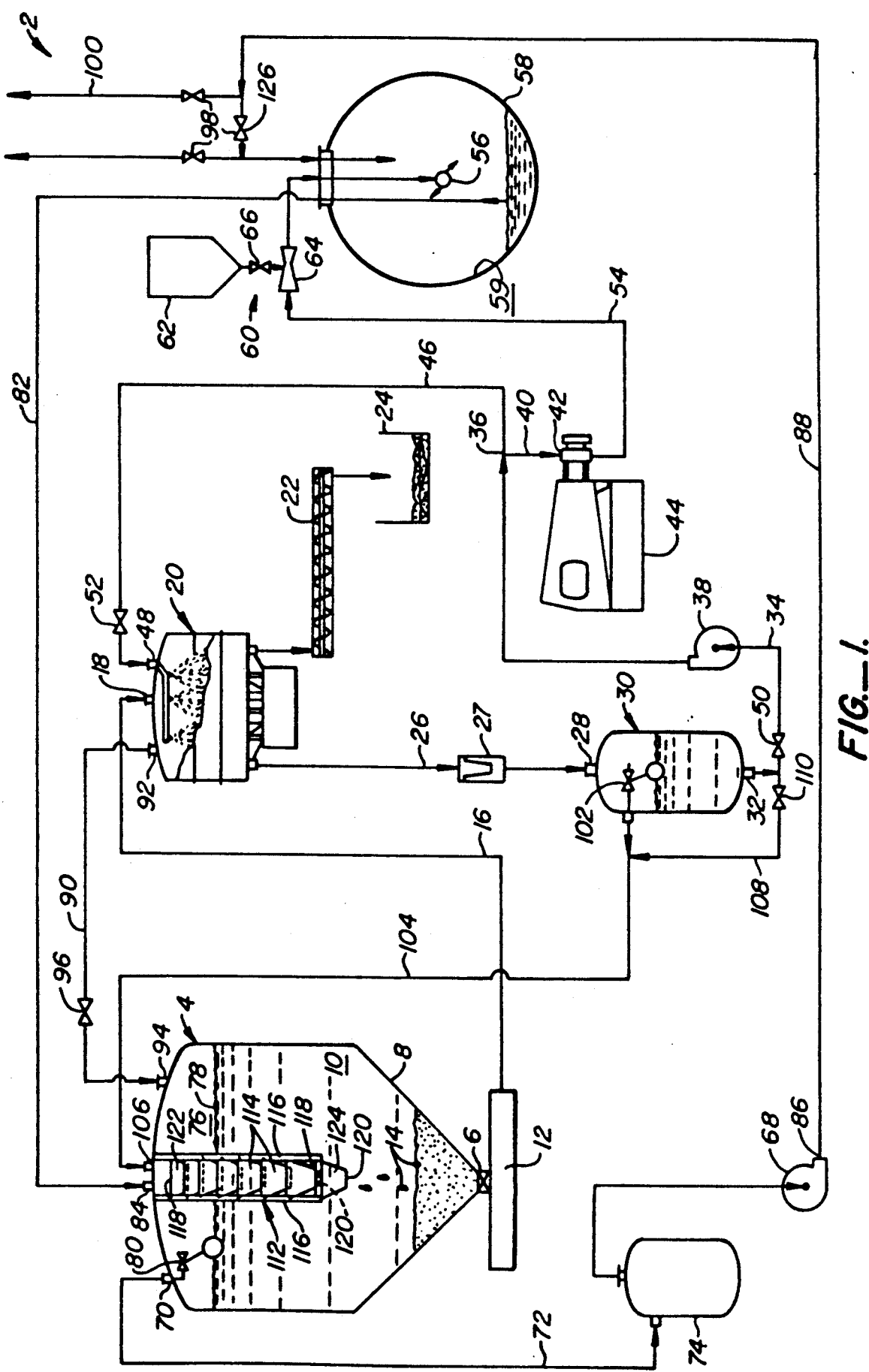
FIG._1.

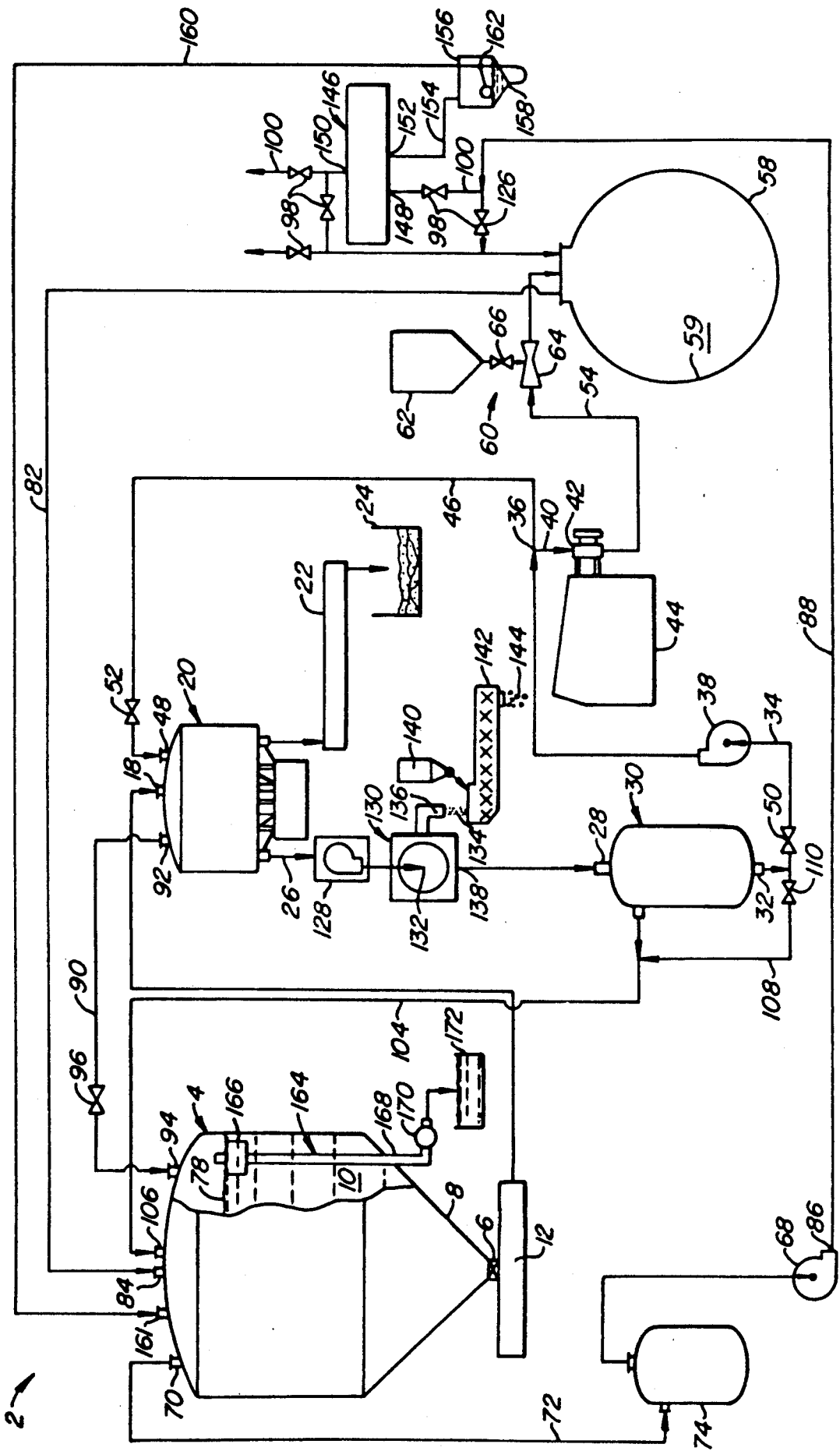
FIG._2.

DIRTY SURFACE CLEANING METHOD

This application is a continuation-in-part of U.S. patent application Ser. No. 662,880, filed Oct. 19, 1984 now U.S. Pat. No. 4,527,700 for Recycled Liquid Cleaning System and U.S. patent application Ser. No. 657,284, filed Oct. 2, 1984, for vacuum Loading Cleaning System, now U.S. Pat. No. 4,619,815.

BACKGROUND OF THE INVENTION

The present invention is related to pressurized cleaning systems, particularly one which uses a vacuum line for the pickup of the cleaning liquid and dislodged contaminants from a dirty tank or other dirty surface, removes the dislodged contaminants from the cleaning liquid and recycles the cleaning liquid fog spraying against the dirty surface.

Industrial tanks are often cleaned after the tank is empty. To do so the interior of the tank is usually sprayed with cleaning liquids to dislodge the contaminants, both liquid and solid, from the tank surfaces. The pumps used typically operate at pressures ranging from about 1000 to 10,000 psi. Because the impact of the spray is diffused if there is a liquid layer within the tank, it is desirable to keep the amount of cleaning liquid (as well as dislodged contaminants) which collects at the bottom of the tank to a minimum.

Oil tankers pose special problems for tank cleaning apparatus. Oil as pumped out of the ground commonly contains rocks, sand and gravel. In addition to this naturally present foreign matter, a great number of rags find their way into the oil holding compartments of oil tankers. The presence of contaminants of types which both float and sink create additional problems during cleaning operations when the cleaning liquid is recycled.

A tank cleaning system has been used wherein a cleaning liquid is sprayed into the tank and simultaneously sucked out of the tank. This cleaning system is illustrated in U.S. Pat. No. 4,466,154 at FIGS. 1 and 2. The cleaning liquid is stored in a pressure vessel and incompletely fills the vessel so that a space is left above the free surface of the liquid. A pressure pump draws the liquid from the lower regions of the vessel and forces the liquid through a pressure line to a gas fired heat exchanger. The cleaning liquid is heated as it passes through the heat exchanger and then passes through a line where the high pressure, high temperature liquid is used to clean inside of the tank.

Simultaneously with the spraying of the cleaning liquid in the tank, a vacuum line, with this known method, draws the sprayed cleaning liquid and dislodged contaminants from the bottom of the tank. The vacuum line terminates at the pressure vessel where the cleaning liquid and contaminants are discharged into the cleaning liquid therein. A partial vacuum is created within the space above the free surface of the liquid within the pressure vessel by a vacuum pump. Cleaning liquid and contaminants withdrawn from the tank never pass through the vacuum pump.

Although the available systems will allow tanks to be cleaned using recycled cleaning liquid, they lack an efficient method of handling solid contaminants.

SUMMARY OF THE INVENTION

The dirty surface cleaning method of the invention is typically carried out using a pressure vessel containing a cleaning liquid. The cleaning liquid, along with solids collecting at the bottom, is typically removed from the bottom of the pressure vessel by a solids remover pump. The solids and liquid pass into a solids separator which separates the solids from the liquid. The liquid from the solids separator collects in a makeup tank. Liquid from the makeup tank is pumped at high pressures into the dirty tank to be cleaned.

If desired, the liquid from the solids separator can be directed to a centrifuge which removes fine solid matter from the liquid before it passes into the collector tank. The fine solids can be blended with a solidification medium to form disposal cake for easy disposal.

A vacuum pump draws a partial vacuum above the free surface of the cleaning liquid within the pressure vessel. A vacuum line is connected at its inner end to the partial vacuum space above the free surface of the cleaning liquid; its outer end is positioned on the bottom of the dirty tank to suck up the cleaning liquid and dislodged contaminants from the dirty tank.

To ensure sufficient liquid is available for the high pressure pump, the solids remover pump is preferably set so more liquid is pumped into the solids separator, subsequently flowing into the makeup tank, than is needed by the high pressure tank. This excess liquid is withdrawn from the makeup tank through a vacuum line connecting a float valve in the makeup tank with the partial vacuum space.

Another feature is the use of a scrubber to remove undesirable components from the vacuum pump exhaust. The scrubber preferably removes condensable liquids from the exhaust for return to the pressure vessel.

A phase separator can be mounted beneath the suction inlets in the pressure vessel so that the cleaning liquid and dislodged contaminants from the dirty tank first pass through the phase separator as they enter the pressure vessel. The phase separator includes a number of vertically aligned, downwardly and inwardly tapered circumferential concentrators, typically having truncated conical shapes, open tops and open bottoms. The concentrators are mounted with the bottom of one concentrator generally horizontally aligned with the top of the underlying concentrator. The concentrators aid the phase separation of the contaminants, vapors, gases and cleaning liquid. The uppermost concentrators are above the free surface so the cleaning liquid and contaminants impact against the inner surfaces of the uppermost concentrators; this provides a degassing function and tends to cause gases and vapors to be driven off before entering the cleaning liquid in the pressure vessel.

The concentrators cause the solids to settle on the bottom of the pressure vessel much more quickly than would otherwise occur. Heavy solids are directed to a single area below the phase separator. Many light solids, such as rags, become saturated with cleaning liquid within the phase separator and also sink to the bottom along with the heavy solids more quickly than would otherwise occur.

Liquid phase separation, typically between oily contaminants and water-based liquid cleaners, is also aided. Oily substances accumulate along the bottom edges of the concentrators, rise up to the upper edges of the concentrators and flow up along the connecting bars until they reach the free surface of the liquid. At that the time the oil phase spreads out over the free surface. Oil separation is also aided by passing the liquid through the centrifuge. It appears that the centrifuged liquid separates into oily and non-oily phases more quickly than if the centrifuging step is bypassed. An oil skimmer in the pressure vessel can be used for removing any oil layer formed at the free surface of the liquid.

With the present invention, cleaning liquid is recycled, which eliminates the costly disposal problems associated with the single use of a cleaning liquid. This recycling is aided by the rapid phase separation of the vapors, gases, liquids and solids.

Another significant advantage of the present invention is its mobility. By mounting the apparatus to a trailer, the cleaning method can be practiced on site. Railroad tank cars can be cleaned almost anywhere while tanks on ships can be cleaned while docked along a wharf or pier.

Other features and advantages of the present invention will be apparent from the following description in which the preferred methods are set forth in detail in conjunction with the accompanying drawings.

BRIEF DESCRIPTION OF THE DRAWINGS

FIGS. 1 and 2 are schematic representations of apparatus used to carry out the dirty surface cleaning method of the invention.

DETAILED DESCRIPTION OF THE PREFERRED METHODS

Referring now to FIG. 1, the recycled liquid cleaning system 2 used to carry out the dirty surface cleaning system of the invention includes a pressure vessel 4 having a solids and liquid outlet 6 at the bottom of its lower tapered portion 8. Vessel 4 stores a cleaning liquid 10 used during the cleaning process. A solids/liquid removal pump 12 is connected to outlet 6 and pumps a mixture of cleaning liquid 10 and solids 14 from pressure vessel 4 through a line 16 to an inlet 18 of a conventional solids separator 20. Solids separator 20 separates solids from liquid and discharges the solids into a solids conveyor 22 for deposit into a solids disposal box 24. Liquid passes from solids separator 20 through a line 26, through a filter screen 27 and into an inlet 28 of a makeup tank 30. Liquid 10 collects within tank 30 and passes through an outlet 32 of the tank, through a line 34 and to a junction 36 by booster pump 38 placed along line 34. Liquid then passes through a line 30 to an inlet 42 of a high pressure pump 44, such as one made by Aquadyne of Houston, Tex. Excess liquid not needed by pump 44 passes through a line 46 connecting junction 36 with a second inlet 48 of solids separator 20. Flow of liquid along lines 34 and 46 is controlled by valves 50, 52, respectively.

Pump 44 forces liquid through a line 54 at very high pressures, for example 10,000 psi, at a flow rate of about 25 gallons per minute. Line 54 has a wash head 56 at its outer end situated within a tank 58 with dirty surface 59. The very high pressures produced by pump 44 causes even stubborn contaminants within tank 58 to be dislodged. For further cleaning power, an abrasive injector assembly 60 is mounted along line 54. Assembly 60 includes an abrasive hopper 62 connected to a venturi type injector 64. The flow of abrasive is controlled by a valve 66 between hopper 62 and injector 64.

A vacuum pump 68 is connected to a vacuum outlet 70 at the top of pressure vessel 4 through a vacuum line 72. A vacuum receiver-condenser 74 is mounted along line 72 to trap liquid and vapor which may enter line 72 before it reaches vacuum pump 68. When receiver-condenser 74 becomes filled with liquid, a valve within it closes to prevent liquid from entering pump 68. Pump 68 draws a partial vacuum within a partial vacuum region 76 above the free surface 78 of liquid 10. A high level shut-off valve 80 is mounted to vacuum outlet 70 to keep liquid from being drawn into line 72 in the event free surface 78 becomes too high.

A vacuum line 82 is connected to a first vacuum inlet 84 in vessel 4 at one end and to a region at which liquid and contaminants collect within tank 58 at its other end. The partial vacuum within region 76 causes liquid and dislodged contaminants to be sucked up through line 82 and into pressure vessel 4. If needed a booster pump, of the type commonly used to pump trash, can be used to aid the movement of material along line 82.

Often the act of cleaning tank 58 will be accompanied by the release of noxious or poisonous gases or vapors. In such situations it is desirable that system 2 be a closed loop for both the protection of the operators and the environment. To accomplish this, the outlet 86 of vacuum pump 68 is connected by a line 88 to the interior of tank 58. Also, solids separator 20 is connected to region 76 by a line 90 which connects an outlet 92 of separator 20 to a second vacuum inlet 94 of pressure vessel 4; the use of this feature is controlled by operating a valve 96 placed along line 90. Likewise, a set of valves 98 control the passage of exhaust gases from pump 68 through line 88 either into tank 58 or into the atmosphere through an exhaust line 100.

To ensure an adequate supply of cleaning liquid 10 to pump 44, pump 12 pumps solids and liquid at a rate sufficiently high, for example 50-60 gpm, so that the liquid passing through pump 12 is at a rate in excess of the pumping rate of high pressure pump 44. To accommodate this excess liquid, makeup tank 30 includes a float-operated valve 102 which opens when the level of the liquid within tank 30 is excessively high. When this occurs, the excess liquid is drawn back into pressure vessel 4 through a line 104 and a third vacuum inlet 106. A cleanout line 108 connects line 34 to line 104 and is used to withdraw liquid and any solids which may have settled within tank 30 back into pressure vessel 4. This cleanout function is controlled by opening and closing a valve 110 along line 108.

Pump 34 is normally set to pump liquid at a rate greater than required by pressure pump 44. The extra liquid helps to ensure solids 14 are well washed within solids separator 20 even when the proportion of solids to liquid is high. Pumping excess cleaning liquid 10 along line 46 can also help to reduce the effects which fluctuations in the amount of liquid withdrawn by pump 12 have on the liquid level of makeup tank 30.

If desired, the liquid sprayed into tank 58 may be heated to increase the cleaning effectiveness. Although a rotary wash head 56 is shown, other types of apparatus can be used as well. For example, conventional self-propelled rotor heads can be used to move about the tank independently to dislodge and break up solids and other contaminants for removal through line 82. Hand-held sprayers may be used to clean certain particularly troublesome areas to dislodge and pulverize the solids for removal. This aspect is especially advantageous when combined with use of abrasive injection assembly 60.

A phase separator 112 is mounted within vessel 4 directly beneath suction inlets 84, 106. Phase separator 112 includes a number of truncated downwardly and inwardly tapering concentrators 114 connected to one another by a number of vertical connecting bars 116.

Concentrators 114 have open tops 118 and open bottoms 120 to allow the material discharged through inlets 82, 118 to pass downwardly through concentrators 114. The amount of taper of concentrators 114 increases from the top concentrator 122 to the bottom concentrator 124. Concentrators 114 are positioned both above and below the free surface 78 of cleaning liquid 10.

Much of the material discharged into phase separator 112 first impacts against the uppermost of concentrators 114 which direct the material downwardly and inwardly. This impact also helps to release gases and vapors directly into region 76 (rather than having gases be released in liquid 10) thus aiding prompt gas-liquid phase separation. Solid material is concentrated towards the central axis of separator 112 as it moves downwardly. Rocks and other heavy material fall freely through separator 112 where they collect within lowered tapered portion 8 of pressure vessel 4. Some solid matter, such as rags, has a tendency to float. However, such material remains within concentrators 114, gets soaked and sinks to the bottom of pressure vessel 4 much more quickly than would otherwise occur.

Assuming cleaning liquid 10 is a water based solvent, phase separation of oily residues from dirty tank 58 is aided by phase separator 112 in the following manner. The oil collects on the surfaces of concentrators 114 and flows upwardly toward their tops 118. The oil then travels upwardly along connecting bars 116 until it reaches free surface 78 at which time it spreads out over the free surface.

In use, wash head 56 is mounted within tank 58 at an appropriate position. Line 82 is connected so that its outer end is at a low place within tank 58 to soak up the cleaning liquid and dislodged contaminants during operation. Assuming system 2 is to be operated as a closed system, valve 96 is opened while valve 126 of valve set 98 is opened and the other valves of valve set 96 are closed. Valves 66 and 110 are closed, while valves 50 and 52 are open. Vacuum pump 68 is actuated to draw a partial vacuum within region 76. Pump 12 pumps a mixture of cleaning liquid 10 and solids 14 through line 16 into solids separator 20 at about 50-60 gpm. The solids and liquid are separated, the solids being deposited in box 24 while the liquids enter makeup tank 30. Booster pump 38 pumps the liquid from tank 30 both to high pressure pump 44 and also back into solids separator 20. Pump 44 forces the cleaning liquid through wash head 56 at very high pressures and at a flow rate less than that of pump 12, for example 10,000 psi and 25 gpm. Cleaning liquid, dislodged contaminants, gases and vapors are sucked back into region 76 through line 82 for discharge into phase separator 112. Much of the gases and vapors is released from this mixture while still above free surface 78 by the mixture's impact against the uppermost of concentrators 114. Within liquid 10, oily substances collect on the surfaces of concentrator 114 and rise up the concentrator surfaces and connecting bars 116 where they disperse over free surface 78. Solids pass through the open tops and bottoms 118, 120 of concentrators 114 for deposit into tapered portion 8 of pressure vessel 4. Gases and vapors released within solids separator 20 are drawn off through line 90 into partial vacuum region 76.

Referring now to FIG. 2, apparatus used to carry out a second aspect of the invention is shown. In FIG. 2, like elements to those of the embodiment of FIG. 1 have like reference numerals. A centrifuge 130 is placed along line 26 following a liquid collecting tank and pump 128 so liquid from separator 20 enters centrifuge inlet 132. Fine solids 134, which were not removed by separator 20 or screen 27, are discharged from a solids outlet 136 while centrifuged liquid is discharged from centrifuge liquid outlet 138. Fine solids 136 are combined with a solidification medium 140 in a blender/extruder 142 to create disposal cake 144 for ease of disposal. In addition to removing fine solids 134, centrifuging the liquid tends to aid oil separation in vessel 4.

An exhaust scrubber 146 is used along exhaust line 100 to remove certain components from the exhaust from vacuum pump 68. The exhaust enters a scrubber inlet 148 whereupon components, including condensable gases, are removed with the scrubbed gases passing from scrubber gas outlet 150. Condensate passes from a scrubber liquid outlet 152 and flows through a line 154 into a collector tank 156. Tank 156 has an outlet 158 connected to one end of a line 160 which opens into region 76 of vessel 4 at its other end 161. A shut-off valve 162 is positioned along line 160 to open line 160 when the liquid level in tank 156 is above a chosen level to allow liquid to be sucked into vessel 4.

An oil skimmer 164 is mounted to vessel 4 and includes a floating skimmer head 166 mounted to a skimmer pipe 168. When it is wished to skim the layer of liquid at free surface 78, typically oil, a valve 170 is opened to allow the skimmed liquid to be collected in a receptacle 172.

Modification and variation can be made to the disclosed apparatus and methods without departing from the subject of the invention as defined in the following claims.

I claim:

1. A method of cleaning a dirty surface using a main vessel containing a cleaning liquid in which the cleaning liquid is recycled comprising the following steps:

directing cleaning liquid, along with any solids settling in the main vessel, at a first flow rate from an outlet in the main vessel to a solids separator, the outlet situated at a low, solids-collection region of the main vessel;

separating solids from liquid at the solids separator;

collecting the liquid from the solids separator at a makeup tank;

pumping liquid from the makeup tank to a wash head nozzle at a second flow rate less than the first flow rate;

directing the liquid from the wash head to the dirty surface to dislodge contaminants therefrom;

withdrawing excess liquid from the makeup tank and returning said excess liquid to the main vessel; and removing liquid and dislodged contaminants from a collection point associated with the dirty surface and depositing the removed liquid and dislodged contaminants into the main vessel.

2. The cleaning method of claim 1 further comprising the step of creating a partial vacuum within a partial vacuum region in the main vessel above a free surface of the cleaning liquid therein.

3. The cleaning method of claim 2 wherein said withdrawing/returning and removing/depositing steps are carried out by fluidly connecting said makeup tank and said collection point to said partial vacuum region so said excess liquid and the removed liquid and dislodged contaminants are drawn into the main vessel by vacuum forces.

4. The cleaning method of claim 1 wherein the pumping step includes the steps of:

pumping liquid by a lower pressure pump from the makeup tank to a higher pressure pump at a rate in excess of the second flow rate;

pumping liquid by the higher pressure pump to the wash head at the second flow rate; and diverting the excess liquid from between the lower and higher pressure pumps back into the solids separator.

5. The cleaning method of claim 1 further comprising the step of adding an abrasive to the cleaning liquid prior to the directing step.

6. A method of cleaning a dirty surface using a vessel containing a cleaning liquid in which the cleaning liquid is recycled comprising the following steps:

directing cleaning liquid, along with any solids settling in the vessel, at a first flow rate from an outlet in the vessel to a solids separator, the outlet situated at a low, solids-collection region of the vessel;

separating solids from liquid at the solids separator;

passing the liquid from the solids separator through a centrifuge to separate said liquid into centrifuged liquid and centrifuged solids;

collecting the centrifuged liquid from the centrifuge at a makeup tank;

pumping liquid from the makeup tank to a wash head at a second flow rate less than the first flow rate;

directing the liquid from the cleaning nozzle to the dirty surface to dislodge contaminants therefrom;

withdrawing excess liquid from the makeup tank and returning said excess liquid to the vessel; and removing liquid and dislodged contaminants from a collection point associated with the dirty surface and depositing the removed liquid and dislodged contaminants into the vessel.

7. The cleaning method of claim 6 further comprising the step of creating a partial vacuum within a partial vacuum region in the vessel above a free surface of the cleaning liquid therein.

8. The cleaning method of claim 7 wherein said withdrawing/returning and removing/depositing steps are carried out by fluidly connecting said makeup tank and said collection point to said partial vacuum region so said excess liquid and the removed liquid and dislodged contaminants are drawn into the vessel by vacuum forces.

9. The cleaning method of claim 6 wherein the pumping step includes the steps of:

pumping liquid by a lower pressure pump from the makeup tank to a higher pressure pump at a rate in excess of the second flow rate;

pumping liquid by the higher pressure pump to the wash head at the second flow rate; and diverting the excess liquid from between the lower and higher pressure pumps back into the solids separator.

10. The cleaning method of claim 6 further comprising the step of adding an abrasive to the cleaning liquid prior to the directing step.

11. The cleaning method of claim 7 wherein the partial vacuum creating step includes the step of pumping gases from an upper region of the vessel by a vacuum pump to create a partial vacuum region therein.

12. The cleaning method of claim 11 further comprising the step of scrubbing the exhaust from the vacuum pump with an exhaust scrubber.

13. The cleaning method of claim 12 further comprising the step of directing liquid from the exhaust scrubber to the vessel.

14. The cleaning method of claim 7 further comprising the step of skimming the free surface of the cleaning liquid to remove the liquid at the free surface from the vessel.

15. The cleaning method of claim 6 further comprising using a phase separator within the main vessel.

* * * * *